UNITED STATES PATENT OFFICE.

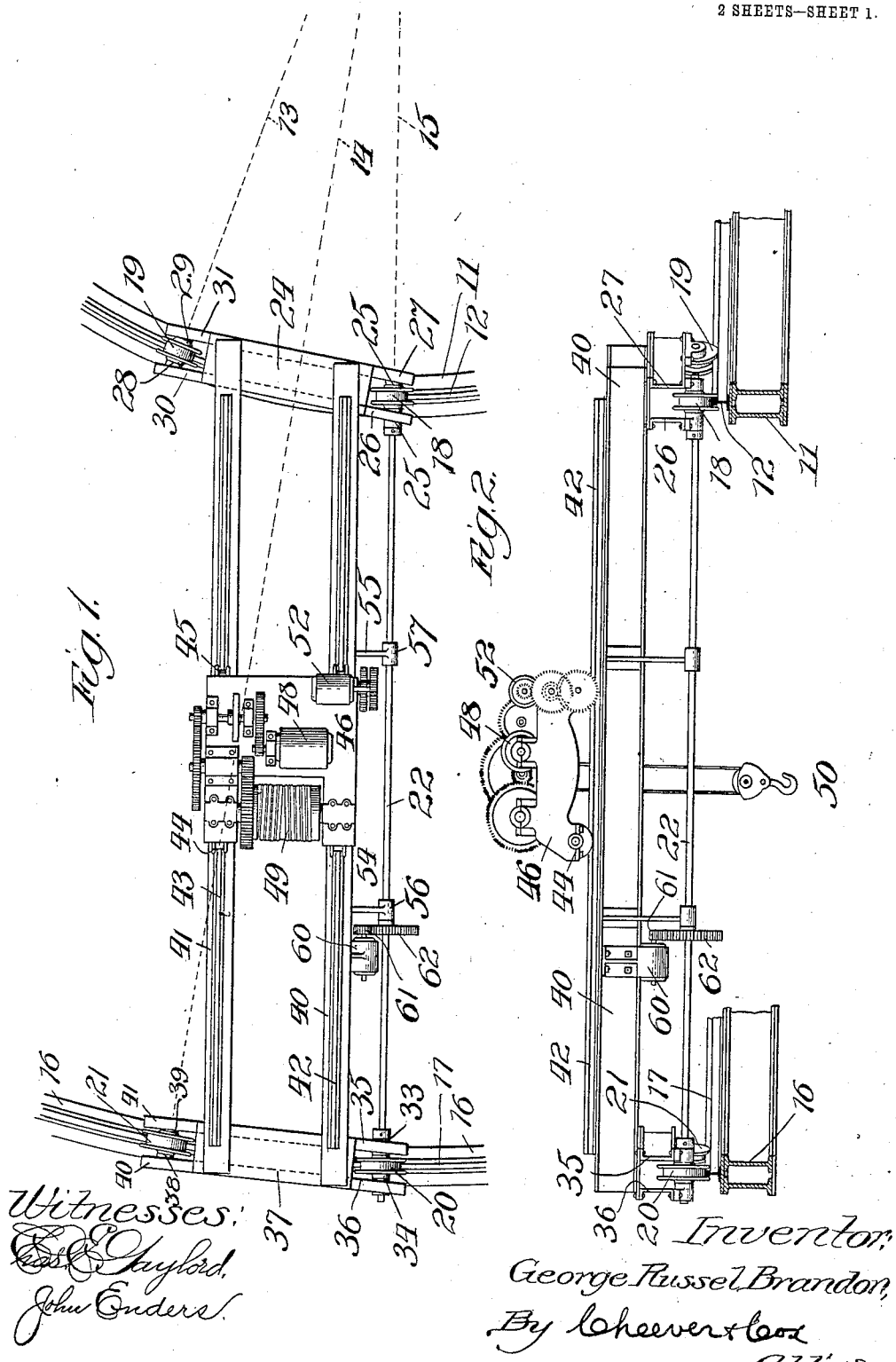

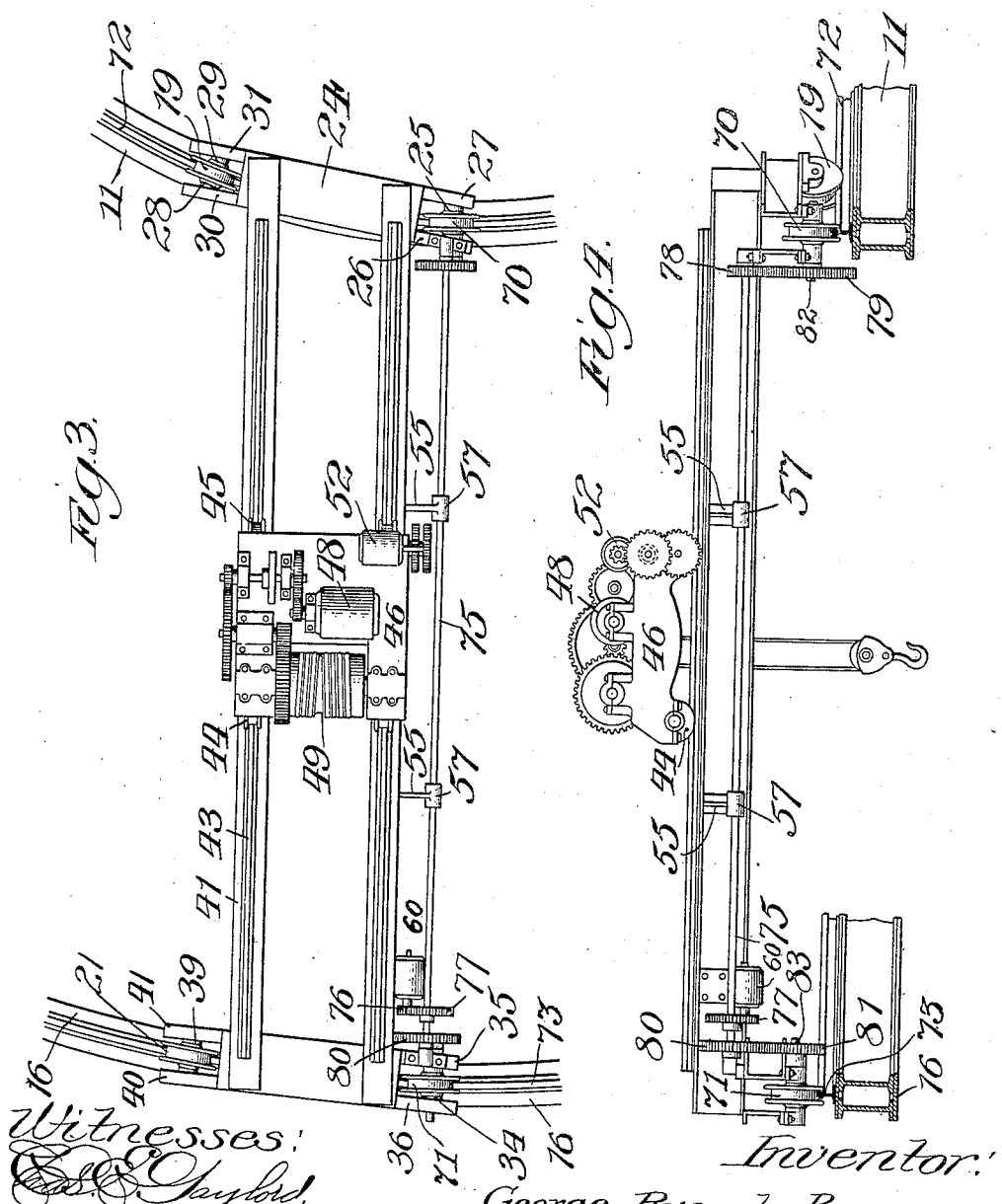

GEORGE RUSSEL BRANDON, OF CHICAGO, ILLINOIS, ASSIGNOR TO WHITING FOUNDRY EQUIPMENT COMPANY, OF HARVEY, ILLINOIS, A CORPORATION OF ILLINOIS.

TRAVELING CRANE.

No. 832,119.　　　　　Specification of Letters Patent.　　　　　Patented Oct. 2, 1906.

Application filed April 16, 1906. Serial No. 311,958.

*To all whom it may concern:*

Be it known that I, GEORGE RUSSEL BRANDON, a citizen of the United States, residing at Chicago, in the county of Cook and State of Illinois, have invented a certain new and useful Improvement in Traveling Cranes, of which the following is a specification.

My invention relates to traveling power-cranes adapted for use upon concentric circular tracks, such as in railroad locomotive-roundhouses.

The object of my invention is to provide such a crane for this use which can be made with the least possible change from the standard parts of a crane designed for use upon ordinary parallel tracks.

My invention consists in such a mechanism capable of accomplishing the above objects, which can be easily and cheaply made and installed, which is efficient in operation and not readily liable to get out of order, and in details of construction which will be hereinafter more fully described and claimed.

Referring to the drawings, Figure 1 is a plan view of the crane embodying my invention in its preferred form. Fig. 2 is a side view of the device of Fig. 1. Fig. 3 is a plan view of a modified form of the device of my invention, and Fig. 4 is a side view of the same.

Again referring to the drawings, 11 represents the top of the inner circular wall of the roundhouse or other suitable circular support carrying a circular rail 12, the same being formed as the circumference of a circle whose center is at the point of intersection beyond the figure of the radial lines 13, 14, and 15 of Fig. 1. Similarly, the numeral 16 represents the top of the outside roundhouse-wall or other suitable support bearing a circular rail 17, which is the circumference of a circle concentric with that of track 12, as heretofore described. Upon the circular track 12 I place two supporting-wheels 18 and 19, the wheel 18 being upon one radius 15 of the track, while wheel 19 is upon a different radius 13 of the same track, or, in other words, both wheels are adapted to travel around the track 12, but are not in the same vertical plane, as will be readily unstood by an inspection of the drawings. Similarly, upon track 17 I place two wheels 20 and 21, the wheel 20 upon the radius 15 of the track 17 and the wheel 21 upon another radius 14 of said track 17. These two wheels are thus so mounted that they travel around the track 17, but are not in the same vertical plane.

It will be noted that the wheels 18 and 20 are placed upon the same radius-line 15 from the center of the tracks, from which it follows that they are parallel to each other and at right angles to a common shaft 22. For economy in building the wheels 18 and 19 are made the same distance from each other that the wheels 20 and 21 are distant from each other, in view of which the wheels 19 and 21 are on different radii 13 and 14 and cannot, therefore, be mounted upon a common shaft at right angles to them, and as a matter of fact these wheels are simply idler supporting-wheels.

The wheels 18 and 19 and the wheels 20 and 21 are so proportioned in size with reference to the circumferential lengths of the tracks over which they have to travel that wheels 18 and 20 will each make exactly the same number of revolutions in making one complete journey around their respective tracks—in other words, so that they will each travel around their respective tracks in the same unit of time or at the same angular speed, and therefore they will always be on a common radius, line of both concentric tracks. By "angular speed" as used herein is meant angular speed of the ends of the crane about the common center of the tracks. In view of this the shaft 22, which in the preferred form is concentric with the wheels 18 and 20, travels in a position in which it is upon a direct radius line of the concentric circles of both tracks. In order to allow for this difference in diameters of the wheels upon the different tracks I, in the preferred form of construction here shown, make the track 17 enough lower than the track 12 to allow the shaft 22, and consequently the entire crane, as will hereinafter appear, to run level upon both tracks.

The wheel 18, rigidly secured to the shaft 22, is journaled at 25 in the fork-arms 26 and 27 of the inner end or truck frame 24 of the crane, while the wheel 19 is journaled at 28 and 29 in fork-arms 30 and 31 at the opposite end of said inner end frame 24. As the wheels 18 and 20 do not travel in a straight line, but upon a circular track, these wheels are journaled on axes angular to each other, as shown. Similarly, the outer end of the shaft 22, carrying wheel 20, is journaled at 33 and 34 in fork-arms 35 and 36 of the outer end frame 37 of the crane, and the wheel 21 is journaled at 38 and 39 in fork-arms 40 and 41 in the opposite end of said outer truck-frame 37. The two truck-frames 24 and 37 are, as shown, of substantially equal lengths, so that the four wheels 18, 19, 20, and 21 occupy the four corners of a parallelogram.

In view of the proportioning of the heights of the wheels and tracks heretofore described the tops of these truck-frames 24 and 37 are substantially level, as shown, and over them I secure by suitable means two standard crane-girders 40 and 41, having upon their upper flanges tracks 42 and 43, upon which the wheels 44 and 45 of an ordinary crane-trolley 46 are adapted to roll backward and forward. As is customary in all traveling cranes, this trolley 46 carries a suitable lifting-motor 48, connecting through suitable gearing shown with a power-drum 49, adapted to move and control the load-carrying hook 50. The trolley is also provided with a self-propelling motor 52, adapted through suitable gearing, as shown, to propel the trolley along the tracks 42 and 43.

Upon the front of the crane-girder 40 are one or more standard brackets 54 and 55, forming bearing-supports 56 and 57 for the shafts 22. Secured to the front of girder 40 is a suitable standard motor 60, connected through suitable gearing 61 and 62 to the shaft 22, so that when power is supplied to this motor 60 by electric wires or other suitable means the shaft 22 may at the will of the operator be rotated in either direction, thereby causing the traction-wheels 18 and 20 to rotate and propel the crane in a circle about the center of the tracks.

In Figs. 3 and 4 I have shown a modification of my device in which instead of making the wheel 20 larger than wheel 18 and upon a lower track I make the corresponding wheels 70 and 71 of the same size upon tracks 72 and 73 on the same level. In order to cause the wheel 71 to move along its track at the same angular speed as wheel 70, I move the power or squaring shaft 75, corresponding to shaft 22, out of the line of the wheels and raise it up relative to the crane-girder, as shown, connecting it to the motor 60 by suitable gearing 76 and 77. I connect the inner end of shaft 75 to the wheel 70 by the pinion 78 and gear 79, and I connect the outer end of the shaft to the wheel 71 by the pinion 80 and gear 81, the gear 79 being rigidly connected to the axle 82, carrying the wheel 70, and the gear 81 being rigidly connected to the axle 83, carrying the wheel 71. The gearing just described at each end of the shaft is so proportioned with reference to the length of the tracks that, as in the preferred forms, the track-wheels travel along their respective tracks at equal angular speeds. In this modified structure, as in the preferred form, the centers of the wheels 70 and 71 are kept on the same radial line of both tracks, which is the essential thing.

Having thus described my invention, what I claim as new, and desire to secure by Letters Patent, is—

1. In a crane adapted for use upon concentric tracks, a traction-wheel for the crane upon each track, mounted upon the same radius-line of both tracks, parallel crane-girders parallel to said radius-line supported by said wheels and mechanism for causing said wheels to travel along their respective tracks at equal angular speeds.

2. In a crane adapted to be used upon concentric tracks, a crane-frame supported by four wheels, two upon each track, one wheel of each pair being upon a common radius-line of both tracks, parallel crane-girders with traveling trolley thereon parallel to said common radius-line, and mechanism carried by the crane for propelling said last-mentioned wheels around their tracks at equal angular speeds.

3. In a crane adapted to be used upon concentric tracks, a crane-frame supported by four wheels, at the corners of a parallelogram, two upon each track, one wheel of each pair being upon a common radius-line of both tracks, parallel crane-girders with traveling trolley thereon parallel to said common radius-line, and mechanism carried by the crane for propelling said last-mentioned wheels along their tracks at equal angular speeds.

4. In a crane for use upon concentric curved tracks, four wheels, two on each track, adapted to support the crane-frame, one wheel upon each track being upon a common radius-line of both tracks and parallel to the opposite wheel, two crane-girders parallel to each other and parallel to the radius on which said last-mentioned wheels are mounted, a shaft mounted upon one girder adjacent to said two wheels, mechanism for driving said shaft and mechanism for causing said shaft to rotate said two wheels in such a way that they each travel along their respective tracks at equal angular speeds.

5. In a crane for use upon concentric curved tracks, four wheels at the corners of a parallelogram, two of said wheels being on each track adapted to support the crane-frame, one of said last-mentioned wheels upon each track being upon a common radius-line of both tracks and parallel to the opposite wheel, two crane-girders parallel to each other and parallel to the radius on which said last-mentioned wheels are mounted, a shaft mounted upon one girder adjacent to said two wheels, mechanism for driving said shaft, and mechanism for causing said shaft to rotate said two wheels in such a way that they each travel around their respective tracks at equal angular speed.

6. In a traveling crane for use upon concentric tracks, four supporting-wheels, two adapted to roll upon each track, truck-frames connecting the wheels upon each track, a power-shaft lying upon a radius-line of both tracks having one of the supporting-wheels upon each track mounted thereon, at right angles thereto, adapted to travel along their respective tracks at equal angular speeds, parallel crane-girders mounted upon the truck-frames parallel to the power-shaft, and mechanism for operating said power-shaft.

In witness whereof I have hereunto subscribed my name in the presence of two witnesses.

GEORGE RUSSEL BRANDON.

Witnesses:
LUELLA J. BRANDON,
DWIGHT B. CHEEVER.